United States Patent [19]

Pender et al.

[11] Patent Number: 5,283,586
[45] Date of Patent: Feb. 1, 1994

[54] METHOD OF PHASED MAGNITUDE CORRELATION USING BINARY SEQUENCES

[76] Inventors: Michael Pender, 1648 Orinda Ct., Thousand Oaks, Calif. 91362; Donald Tom, 2510G Las Posas Rd., #132, Camarillo, Calif. 93010

[21] Appl. No.: 23,440

[22] Filed: Feb. 26, 1993

[51] Int. Cl.⁵ .............................................. G01S 7/292
[52] U.S. Cl. ................................... 342/189; 342/195; 342/378; 342/379
[58] Field of Search ............... 342/189, 39, 89, 91, 342/102, 159, 195, 378, 379

[56] References Cited

U.S. PATENT DOCUMENTS

| | | | |
|---|---|---|---|
| H484 | 6/1988 | Holliday | 342/201 |
| 4,259,650 | 3/1981 | Donahue | 342/189 X |
| 4,353,067 | 10/1982 | Mims | 342/201 |
| 4,513,288 | 4/1985 | Weathers et al. | 342/201 |
| 4,566,010 | 1/1986 | Collins | 342/201 |
| 4,580,139 | 4/1986 | Weathers et al. | 342/189 |
| 4,584,579 | 4/1986 | Frost et al. | 342/189 |
| 4,698,827 | 10/1987 | Kretschmer | 342/201 X |
| 4,833,479 | 5/1989 | Carlson | 342/194 |
| 5,070,337 | 12/1991 | Chen et al. | 342/201 |
| 5,189,428 | 2/1993 | Bouvet et al. | 342/132 |

*Primary Examiner*—John B. Sotomayor

[57] ABSTRACT

A method for allowing a correlation function to be applied to binary codes of length 3 to length 255. A user may specify the desired length of the binary codes for correlation processing; whether the binary code is to use a phase sidelobe level as the threshold or a sidelobe amplitude as the threshold. The user will also be asked to specify the threshold as well as an in phase coefficient referred to as beta and an out of phase coefficient referred to as a alpha. When the user has specified the parameters for correlation processing of the binary code length selected by the user, the program of the present invention will process the binary codes eliminating allomorphic forms of the codes from correlation and then display the results to the user.

9 Claims, 6 Drawing Sheets

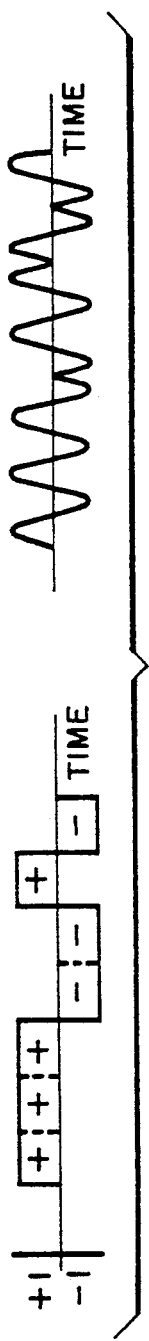
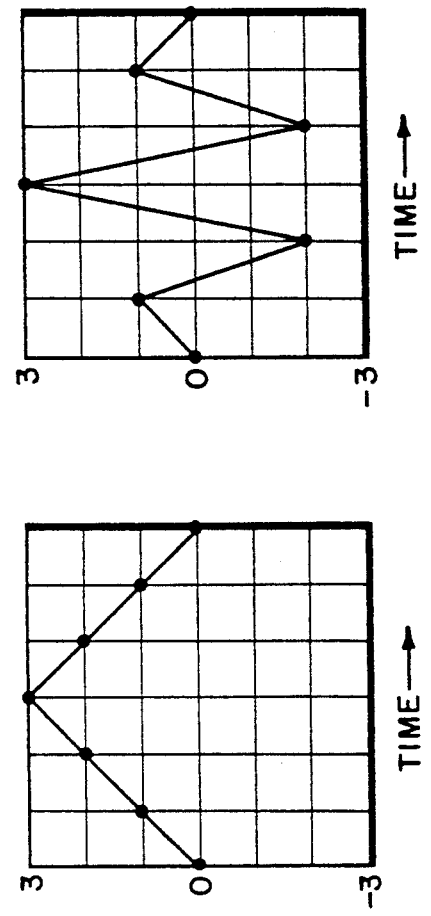
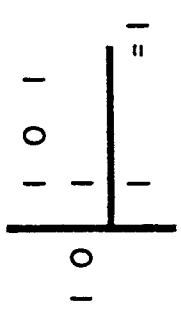
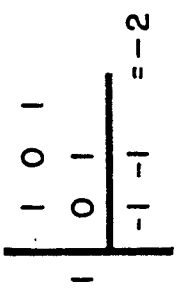
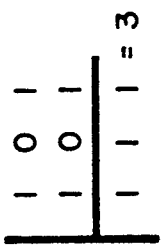
Fig. 1.
Fig. 2b. PRIOR ART(a)
Fig. 2c. (b)
Fig. 2a.

METHOD OF PHASED MAGNITUDE CORRELATION USING BINARY SEQUENCES

BACKGROUND OF THE INVENTION

1. Field of the Invention

The present invention relates generally to pulse compression methods and, in particular, to a method which utilizes binary sequences for maximum sidelobe suppression in a pulse compression radar system or the like.

2. Description of the Prior Art

Pulse compression involves the transmission of a long coded pulse and the processing of the received echo to obtain a relatively narrow pulse. The increased detection capability of a long pulse radar system is achieved while retaining the range resolution capability of a narrow pulse system.

Several distinct advantages are obtained utilizing pulse compression radar systems. For example, transmission of long pulses permits a more efficient use of the average power capability of the radar system. The average power of the radar system may be increased without increasing the pulse repetition frequency and, hence, decreasing the radar system's unambiguous range. Further, pulse compression radar systems are less vulnerable to interfering signals that differ from the coded transmitted signal. The use of long pulses also provides an increased system resolving capability.

A problem that has limited the utility of pulse compression and correlation receivers in radar systems has been the existence of temporal/range sidelobes in the correlation function of the radar waveform. These sidelobes allow out-of range gate returns, such as clutter, to compete with a target in a particular range gate.

A number of research efforts have addressed this problem in the past and several waveform designs have resulted in the potential reduction or elimination of the range sidelobe problem.

For example, in pulse compression radar systems, the Barker code (also known as perfect binary words) is one of the most commonly used Binary phase coded waveforms, because it has a relatively high ratio between its mainlobe and sidelobes. However, the length of the Barker code is relatively short with the maximum length of the Barker code being thirteen binary bits for a minimum sidelobe peak of one.

Several properties of binary coded waveforms are desirable if they are to be used in implementing pulse compression in pulse compression radar and tracking systems such as the target sensor component of a missile or a fire control system. These properties include very low or zero temporal sidelobes in the correlation function and very low or zero cross-correlation with other binary codes that may be implemented in sensors deployed nearby. These properties would ensure that there would be little or no degradation in sensor system performance due to out of range gate clutter returns, multiple target sidelobes or from mutual interference between deployed sensors using different codes.

SUMMARY OF THE INVENTION

Accordingly it is a principal object of the present invention to provide a new method for using correlation techniques to substantially reduce or eliminate temporal/range sidelobes in the correlation function of a radar waveform.

It is another object of the present invention to provide an improved pulse compression technique wherein range sidelobe control is provided with no loss in resolution in the mainlobe.

It is yet another object of the present invention to provide a method whereby long binary codes may be utilized in the correlation function to insure a relatively high ratio between the mainlobe and sidelobes of binary phase coded waveforms.

In order to achieve the above mentioned and other objects of the present invention a method is implemented using a computer program which allows a correlation function to be applied to binary codes of length 3 to length 255. A user may specify the desired length of the binary codes for correlation processing and whether the binary code is to use a phase sidelobe level as the threshold or a sidelobe amplitude as the threshold. The user will also be asked to specify the threshold as well as an in phase coefficient referred to as beta and an out of phase coefficient referred to as a beta. When the user has specified the parameters for correlation processing of the binary code length selected by the user, the program of the present invention will process the binary codes eliminating allomorphic forms of the codes from correlation and then display the results to the user.

BRIEF DESCRIPTION OF THE DRAWINGS

FIG. 1 illustrates a binary phase coded signal utilizing plus ones and minus ones as the phase code;

FIGS. 2($a$), 2($b$) and 2($c$) are a first example illustrating the absolute value of a correlation function for a received binary phase-coded waveform of length three compared with the method of the present invention wherein the sign is retained during correlation of the waveform;

DETAILED DESCRIPTION OF THE PREFERRED EMBODIMENT

Phase-coded waveforms divide the pulse/carrier signal to be transmitted into a number of subpulses of equal duration with each subpulse having a particular phase. The phase of each subpulse is selected in accordance with a given code sequence. The most widely used phase-coded waveform employs two phases and is referred to as binary coding or biphase coding. Typically, the binary code consist of a sequence of either zeros and ones or plus ones and minus ones. The phase of the transmitted signal alternates between 0° and 180° in accordance with the sequence of elements, either zeros and ones, or plus ones and minus ones in the phase code as shown in FIG. 1. As is best illustrated by FIG. 1 the coded signal is generally discontinuous at the phase reversal points (transition from +1 to −1 to +1) since the transmitted frequency is not usually a multiple of the reciprocal of the subpulse width. Upon receiving the echo or return signal of the binary phase coded signal from a target, the compressed pulse may be obtained by well known techniques such as filtering or correlation processing.

Figure 3C:
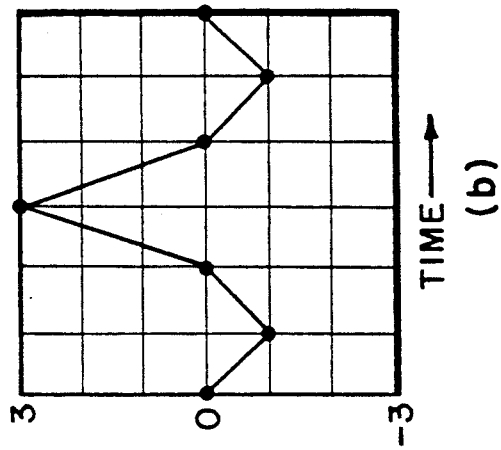
FIGS. 3($a$), 3($b$) and 3($c$) are a second example illustrating the absolute value of a correlation function for a received binary phase-coded waveform of length three compared with the method of the present invention wherein the sign is retained during correlation of the waveform.
Figure 3B:
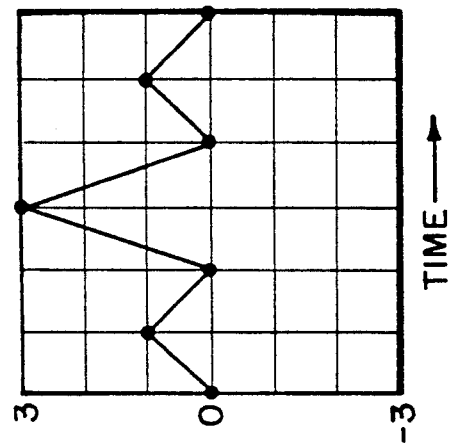
Figure 3A:
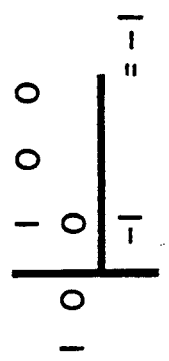
Figure 3A:
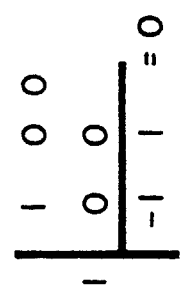
Figure 3A:
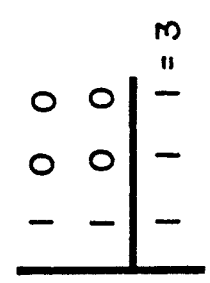

Binary codes whose autocorrelation function or zero doppler response exhibit the minimum possible sidelobes for a given code length of N are very desirable for binary sequences. FIGS. 2(b) and 3(b) illustrate prior art correlation functions for a code length of 3 and binary bit patterns of 1,0,1 FIG. 2(a) and 1,0,0 FIG. 3(a) which utilizes the following lookup table where in phase pairs are represented by a weighting coefficient of one and out of phase pairs are represented by a weighting coefficient of minus one:

TABLE I

| Binary code length = N | | | |
|---|---|---|---|
| 0 × 0 = 1 | 1 × 1 = 1 | 0 × 1 = −1 | 1 × 0 = −1 |

In the prior art correlation process illustrated in FIGS. 2(b) and 3(b) the absolute value of each separate correlation is used to obtain the mainlobe and sidelobes of the received waveform or signal while the software program set forth in Appendix A allows negative numbers to be considered when using the correlation method of the present invention to obtain the mainlobe and sidelobes of the received signal. For the three bit received signal of FIG. 3, the first correlation with the transmitted signal will result in minus one; the second correlation will result in zero and the third correlation will result in plus three. While FIG. 3(b) shows the absolute value of the received signal as having sidelobes of one and a main lobe of three, FIG. 3(c) shows the received signal wherein the sign of each correlation of the subpulses is retained in order to provide a significant gain in mainlobe to sidelobe ratio that leads to better discrimination of the target in pulse compression radar systems. As is best illustrated by FIG. 2(b), a target becomes indistinguishable from sidelobes for some binary sequences when the absolute value of the correlation function is used during processing of the received signal.

In binary phase-coded waveforms, it is desired to use the "optimal binary sequence" as the long coded pulse in a pulse compression radar system because of the ease with such codes may be generated and the desirability of the corresponding correlation functions of echo or received signal. Such long coded pulses are useful in providing reduced range sidelobes in the echo or received signal as well as achieving range sidelobe control with little or no loss in resolution in the mainlobe.

While Barker codes are limited to a maximum code length of thirteen for a minimum peak sidelobe magnitude of one, the method of the present invention may be used to obtain code lengths greater than thirteen having a sidelobe whose magnitude is either zero (the desired "perfect range correlation property) or one which is well within acceptable limits for sidelobes wherein the code length is greater than thirteen.

A binary code may be represented in any one of four allomorphic forms with all four codes having the same correlation characteristics. These codes are the code itself, the inverted code (the coded written in reverse order), the complement of the code (ones are changed to zeros and zeros are changed to ones) and the inverted complemented code. For example, for the 7 bit Barker code 1110010; inverted code is 0100111; the complement of the code is 0001101 and the inverted complemented code is 1011000. The software program of Appendix A utilizes these properties of binary coded waveforms when correlating binary sequences for a given code length N, eliminating codes from the correlation process which are "allomorphic forms" of another code within the binary sequence for the given code length N.

Binary codes of code length four, which is an even code length, set forth in the following Table:

TABLE II

| Binary code length = 4 | | | |
|---|---|---|---|
| 0000 | 0100 | 1000 | 1100 |
| 0001 | 0101 | 1001 | 1101 |
| 0010 | 0110 | 1010 | 1110 |
| 0011 | 0111 | 1011 | 1111 |

The binary code 1111 has only one allomorphic form 0000 which is its compliment. Binary code 1000 has three allomorphic forms, its inverted form 0001, its compliment 0111 and its inverted complimented form 1110.

After the most significant bit of each four bit code is set to a logic one, the program of Appendix A examines the codes in numerical order beginning with 1000 to 1111 and eliminates identical codes (0000 through 0111), that is the program of Appendix A eliminates the inverted form of any binary code.

For even length codes the program of Appendix A next looks for even length doublets and mixed doublets. For an even length code sequence the program of Appendix A compares the bits on the left side of the code sequence with the bits on the right side of the code sequence. Whenever the bits on the left side are identical to the bits on the right side of the code sequence (1010, 1111) or whenever the compliment of the bits on the right side is identical to the bits on the left side of the code sequence (1001, 1100) the program of Appendix A looks for the next sequential even length doublet or mixed doublet, skipping the correlation process for all codes between sequential doublets/mixed doublets. For the binary sequence of Table II, the program of Appendix A skips the correlation process for codes between 1100 and 1110 since 1100 is a mixed doublet and 1111 is a doublet. The program of Appendix A correlates only the codes 1000, 1001, 1010 1011, 1100 and 1111 having eliminating the allomorphic forms of these codes. For example, for the binary code 1000, the program of Appendix A eliminates 1000, the code written in reverse order 0001, its compliment code 0111 and its inverted complemented code 1110. It should be noted that the code 1101 is the complement of the code 0010, while the code 1110 is the complement of the code 0001.

Binary codes of code length five, which is an even code length, are set forth in the following Table:

TABLE III

| Binary code length = 5 | | | |
|---|---|---|---|
| 00000 | 01000 | 10000 | 11000 |
| 00001 | 01001 | 10001 | 11001 |
| 00010 | 01010 | 10010 | 11010 |
| 00011 | 01011 | 10011 | 11011 |
| 00100 | 01100 | 10100 | 11100 |
| 00101 | 01101 | 10101 | 11101 |
| 00110 | 01110 | 10110 | 11110 |
| 00111 | 01111 | 10111 | 11111 |

After the most significant bit of each five bit code is set to a logic one, the program of Appendix A examines the codes in numerical order beginning with 10000 to 11111 and eliminates identical codes (00000 through 01111), that is the program of Appendix A eliminates the inverted form of any binary code.

For odd length codes the program of Appendix A next looks for odd length palindromes, that is the program upon finding a code such as 10001 sets the middle bit to a logic one and then skips to 10101 eliminating the codes 10010, 10011 and 10100 from correlation processing. The program of Appendix A then proceeds to the next sequential palindrome 11011, sets the middle bit to one and eliminates codes 11100, 11101 and 11110 from correlation processing.

The program of Appendix A correlates only the codes 10000, 10001, 10101, 10110, 10111, 11000, 11001, 11010, 11011 and 11111 having eliminated the allomorphic forms of these codes. For example, for the binary code 10000, the program of Appendix A eliminates the code written in reverse order 00001, its complement code 01111 and its inverted complemented code 11110. To illustrate a second example from Table II, for the binary code 10110, the program of Appendix A eliminates the code written in reverse order 01101, its complement code 01001 and its inverted complemented code 10010.

For odd length binary codes a binary sequence A, of length N is a palindrome if for n=0 to (N−1)/2, $A_n = A_{N-a-1}$. For even length binary codes a binary sequence A, of length N is a doublet if for n=0 to (N/2)−1, $A_n = A_{n+N/2}$. Similarly, for even length binary codes a binary sequence A, of length N is a mixed doublet if for n=0 to (N/2)−1, $A_n = \sim A_{n+N/2}$.

The method of the present invention may be used to generate optimal binary codes for use as radar pulse compression codes in code lengths and with sidelobe levels shows as follows:

TABLE IV

| Length of Code | Binary code length 3 to 20; (−1, 1) Magnitude of Sidelobe | | | |
|---|---|---|---|---|
| | 0 | 1 | 2 | 3 |
| 3 | 1 | 1 | 1 | |
| 4 | 0 | 4 | 1 | 1 |
| 5 | 0 | 4 | 4 | 1 |
| 6 | 0 | 6 | 7 | 5 |
| 7 | 1 | 4 | 16 | 8 |
| 8 | 0 | 10 | 19 | 26 |
| 9 | 0 | 15 | 35 | 36 |
| 10 | 0 | 11 | 67 | 82 |
| 11 | 1 | 0 | 134 | 123 |
| 12 | 0 | 16 | 113 | 360 |
| 13 | 0 | 31 | 194 | 501 |
| 14 | 0 | 4 | 355 | 904 |
| 15 | 0 | 0 | 597 | 1324 |
| 16 | 0 | 9 | 405 | 3113 |
| 17 | 0 | 40 | 571 | 4231 |
| 18 | 0 | 8 | 1009 | 6534 |
| 19 | 0 | 0 | 1734 | 8824 |
| 20 | 0 | 3 | 1028 | 18026 |

From Table IV it can be seen that codes of length three when correlated have one binary code with a sidelobe peak magnitude of zero, one binary code with a sidelobe peak magnitude of one and one binary code with a sidelobe peak magnitude of two. These codes are respectively 101 (illustrated by FIG. 2(c)), 100 (illustrated by FIG. 3(c)) and 111.

TABLE V

| Length of Code | Binary code length 3 to 20; (−2, 1) Magnitude of Sidelobe | | | |
|---|---|---|---|---|
| | 0 | 1 | 2 | 3 |
| 3 | 1 | 1 | 1 | |
| 4 | 2 | 2 | 1 | 1 |
| 5 | 1 | 5 | 2 | 1 |

TABLE V-continued

| Length of Code | Binary code length 3 to 20; (−2, 1) Magnitude of Sidelobe | | | |
|---|---|---|---|---|
| | 0 | 1 | 2 | 3 |
| 6 | 2 | 7 | 7 | 2 |
| 7 | 3 | 10 | 12 | 7 |
| 8 | 8 | 18 | 20 | 14 |
| 9 | 13 | 30 | 41 | 25 |
| 10 | 23 | 62 | 69 | 60 |
| 11 | 25 | 139 | 124 | 105 |
| 12 | 44 | 243 | 286 | 190 |
| 13 | 89 | 388 | 591 | 432 |
| 14 | 200 | 723 | 1096 | 871 |
| 15 | 405 | 1262 | 2164 | 1788 |
| 16 | 757 | 2679 | 3653 | 3906 |
| 17 | 1025 | 5704 | 7205 | 6912 |
| 18 | 1951 | 10115 | 15613 | 13227 |
| 19 | 3948 | 17489 | 31291 | 27979 |
| 20 | 8540 | *32932 | *59391 | *56723 |

*Program overflowed code counter, value given is an estimate.

From Table V it can be seen that for a code length of 13, there are 388 binary codes which have a sidelobe peak magnitude of one when in phase pairs are represented by a one and out of phase pairs are represented by a minus two. This is a considerable improvement over Barker codes which have only one binary code of length 13 with a peak sidelobe magnitude of one.

Referring now to FIGS. 4(a), 4(b), 4(c) and 4(d) there is shown a flow chart for the computer software program of Appendix A which constitutes the preferred embodiment of the present invention. Program step 13 requires the user of the software of Appendix A to provide the in phase and out of phase modifiers which are, for example, 1, −1 for the binary codes of Table IV and 1, −2 for the binary codes of Table V. Program step 15 requires the user to provide the code length with the program of Appendix A being able to process codes of length three to codes of length 255. Program step 17 requires the user to specify whether the phased sidelobe level will be used as the threshold, that is, during the correlation process the program of Appendix A considers the sign of each correlation as is best illustrated by FIGS. 2(c) and 3(c). If the answer to program step 17 is "yes" the user is next asked to specify phased sidelobe threshold, that is the maximum value of a sidelobe which the user considers acceptable during the correlation process.

Program step 19 requires the user to specify whether sidelobe amplitude will be used as the threshold, that is, during the correlation process the program of Appendix A considers only the absolute value of each correlation as is best illustrated by FIGS. 2(b) and 3(b). If the answer to program step 19 is "yes", the user is next asked to specify the sidelobe amplitude threshold, that is the maximum value of a sidelobe which the user considers acceptable during the correlation process. Program step 21 ask the user whether all codes which meet the criteria for correlation processing are to be displayed for viewing on a monitor by the user.

The following example illustrates the questions the user observes on a monitor and then answers (program steps 13-21) to correlate all binary codes for a code length of 4.

This program computes pulse compression codes for use with a modified correlation sequence of arbitrary coefficients (Alpha, Beta)

Alpha? −1

-continued

```
Beta? 1
Generate codes of what length? (<256) 4
Use phased sidelobe level as threshhold? (Y/N) Y
Phased sidelobe threshhold? 3
Restrict selection by sidelobe amplitude level? (Y/N) N
Show all evaluated codes? (Y/N) Y
0001      -1      0      1      4    [1]    [1]
1001       1     -2     -1      4    [1]    [2]
0101      -1      2     -3      4    [2]    [3]
1101       1      0     -1      4    [1]    [1]
0011      -1     -2      1      4    [1]    [2]
1111       1      2      3      4    [3]    [3]
0 → 0 1 → 4 2 → 1 3 → 1
6 candidates for length 4. 6 judged acceptable.
Program Ends
```

The following example illustrates the questions the user observes on a monitor and then answers (program steps 13-21) to correlate all binary codes for a code length of 5.

This program computes pulse compression codes for use with a modified correlation sequence of arbitrary coefficients (Alpha, Beta)

```
Alpha? -1
Beta? 1
Generate codes of what length? (<256) 5
Use phased sidelobe level as threshhold? (Y/N) Y
Phased sidelobe threshhold? 4
Restrict selection by sidelobe amplitude level? (Y/N) N
Show all evaluated codes? (Y/N) Y
00001     -1      0      1      2     5    [2]    [2]
10001      1     -2     -1      0     5    [1]    [2]
10101      1     -2      3     -4     5    [3]    [4]
01101     -1      2     -1     -2     5    [2]    [2]
11101      1      0      1      0     5    [1]    [1]
00011     -1     -2     -1      2     5    [2]    [2]
10011      1      0     -3      0     5    [1]    [3]
01011     -1      0      1     -2     5    [1]    [2]
11011      1      2     -1      0     5    [2]    [2]
11111      1      2      3      4     5    [4]    [4]
0 → 0 1 → 4 2 → 4 3 → 1 4 → 1
10 candidates for length 5. 10 judged acceptable.
Program Ends
```

For the illustrated examples the computer software of Appendix A correlates the sidelobe peak value and the peak value of the mainlobe for each binary code of length four and length five and also eliminates all allomorphic forms of the codes from the correlation process. It should be noted that the binary codes which appear on the monitor are read from right to left, that is the most significant bit appears on the right side of the monitor and the least significant bit appears on the left side of the monitor.

During program step 23, the software of Appendix A sets the Most Significant Bit of each code to a logic one. This allows each binary code which has as its Most Significant Bit a logic zero to be eliminated from the correlation process of program steps 81-117.

Figure 4A:
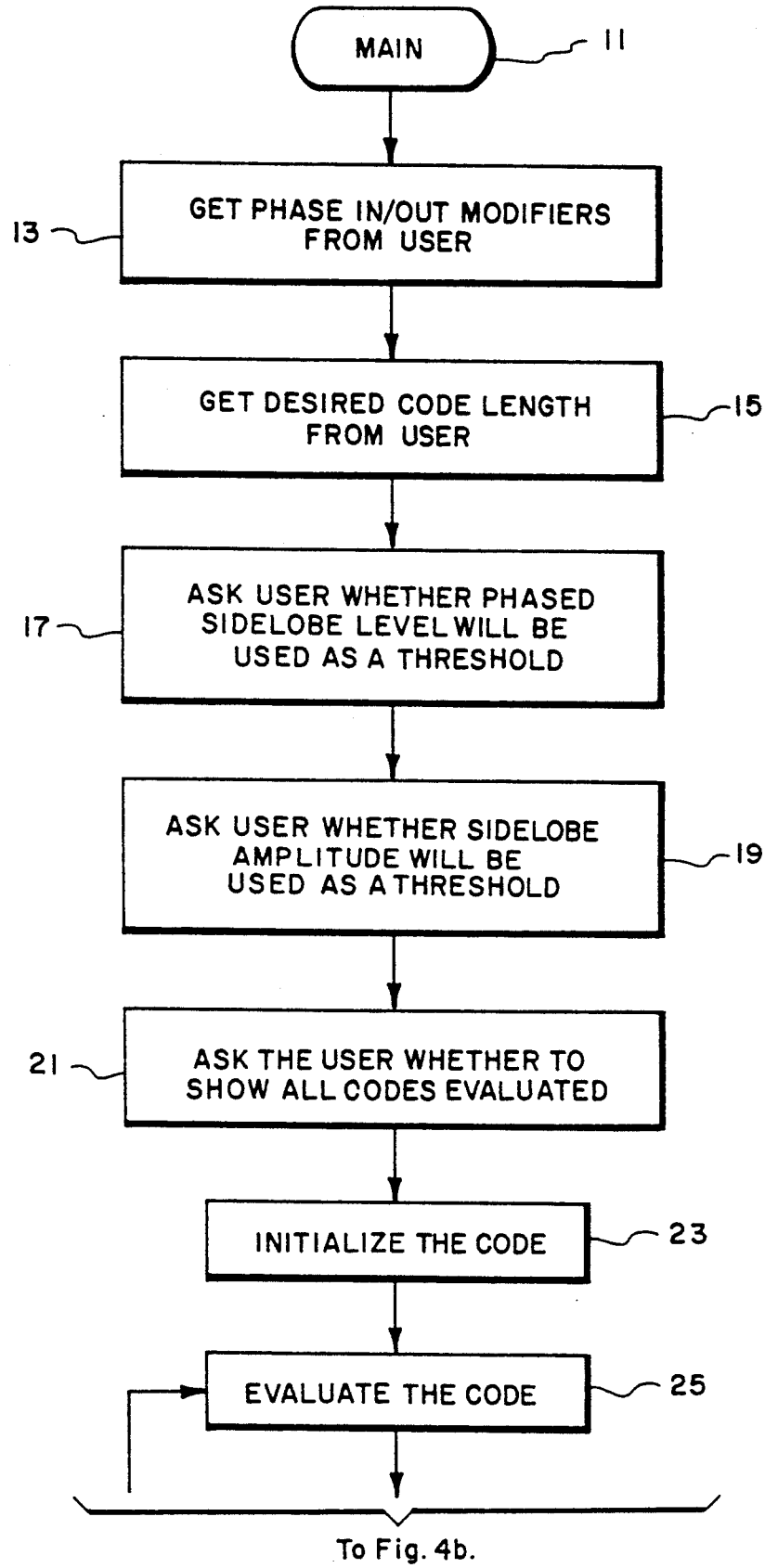
FIGS. 4($a$), 4($b$), 4($c$) and 4($d$) is a flow chart for the computer software program of Appendix A which constitutes the preferred embodiment of the present invention.
Figure 4B:
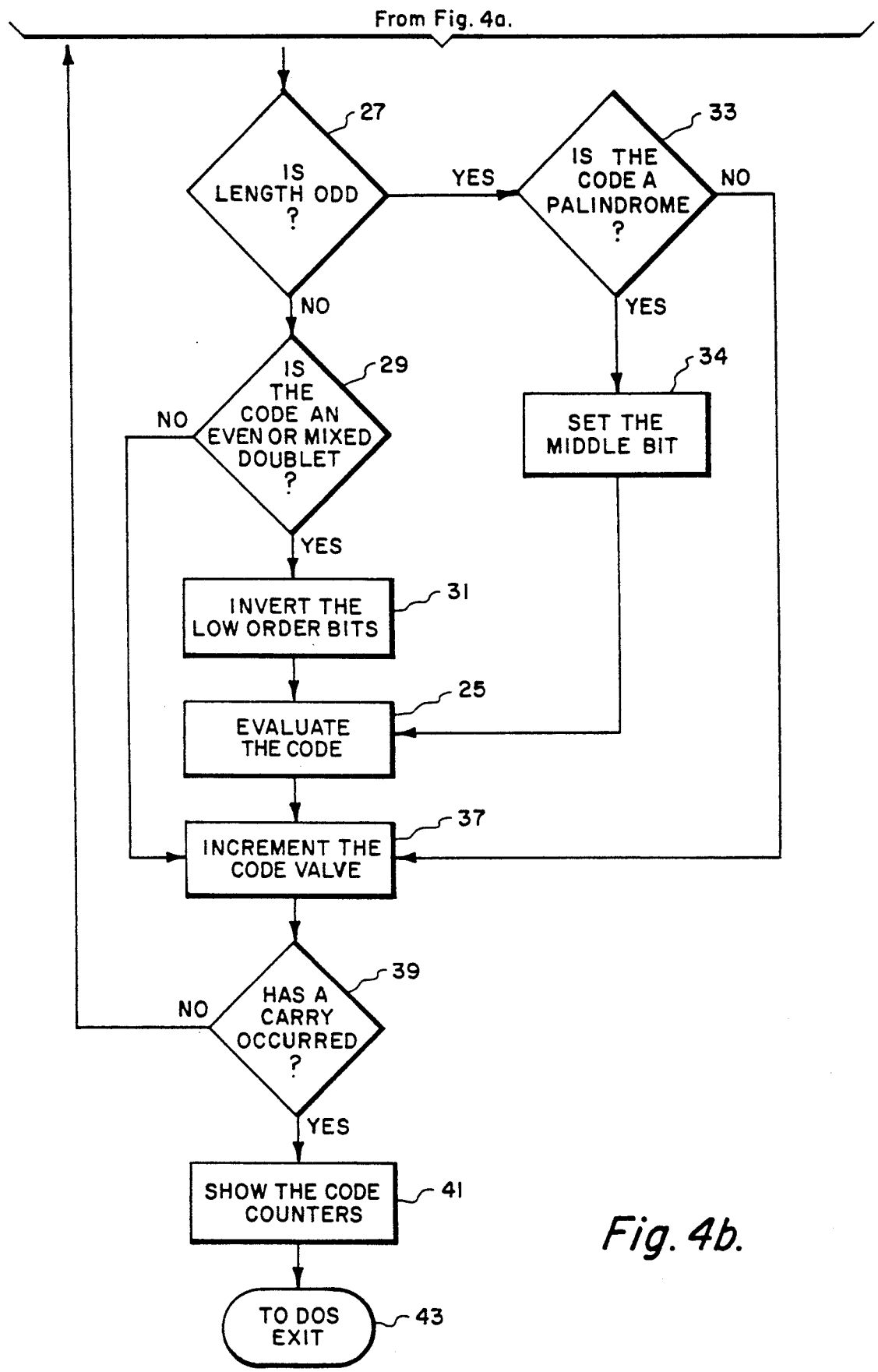
Figure 4C:
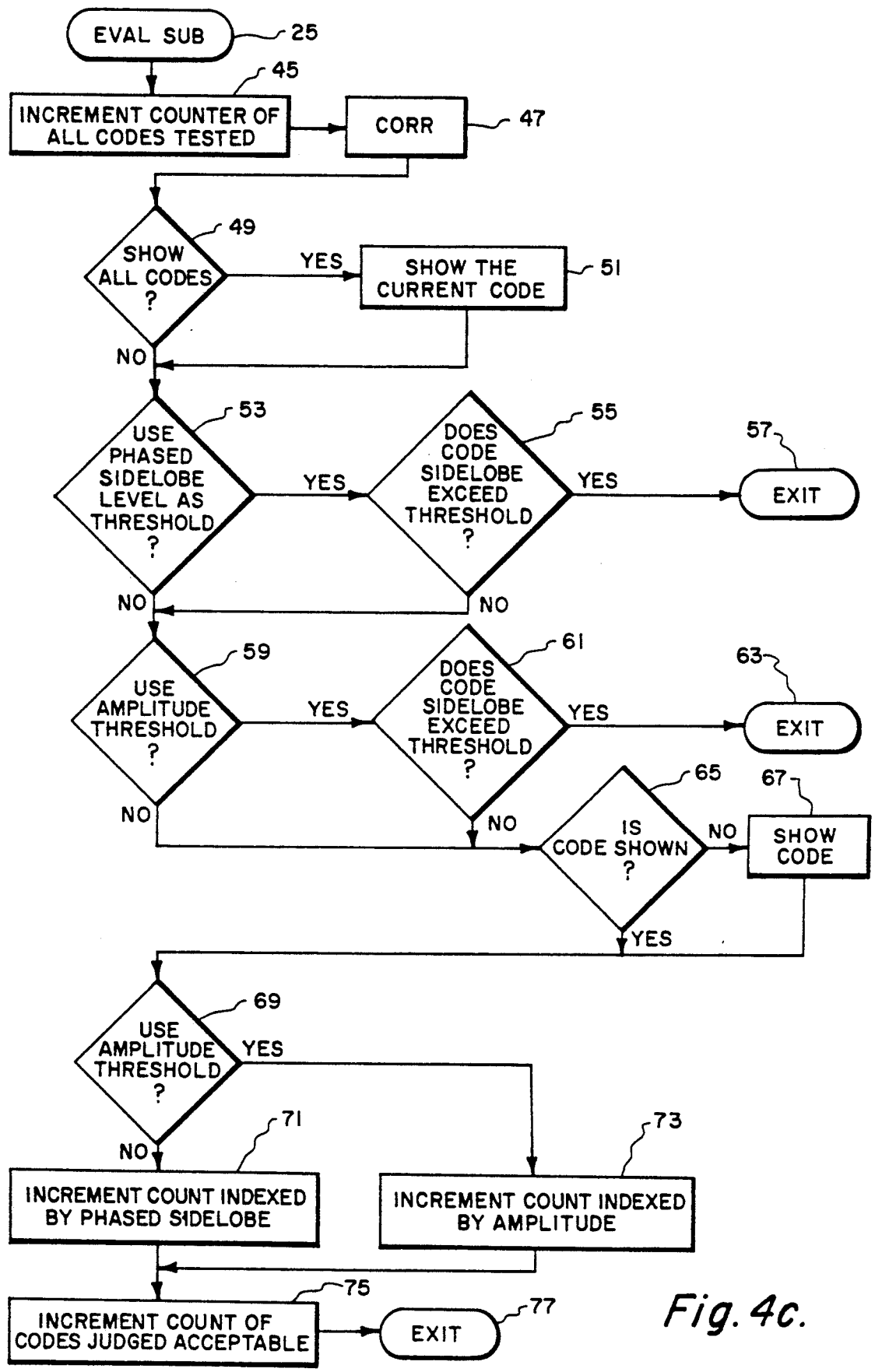
Figure 4D:
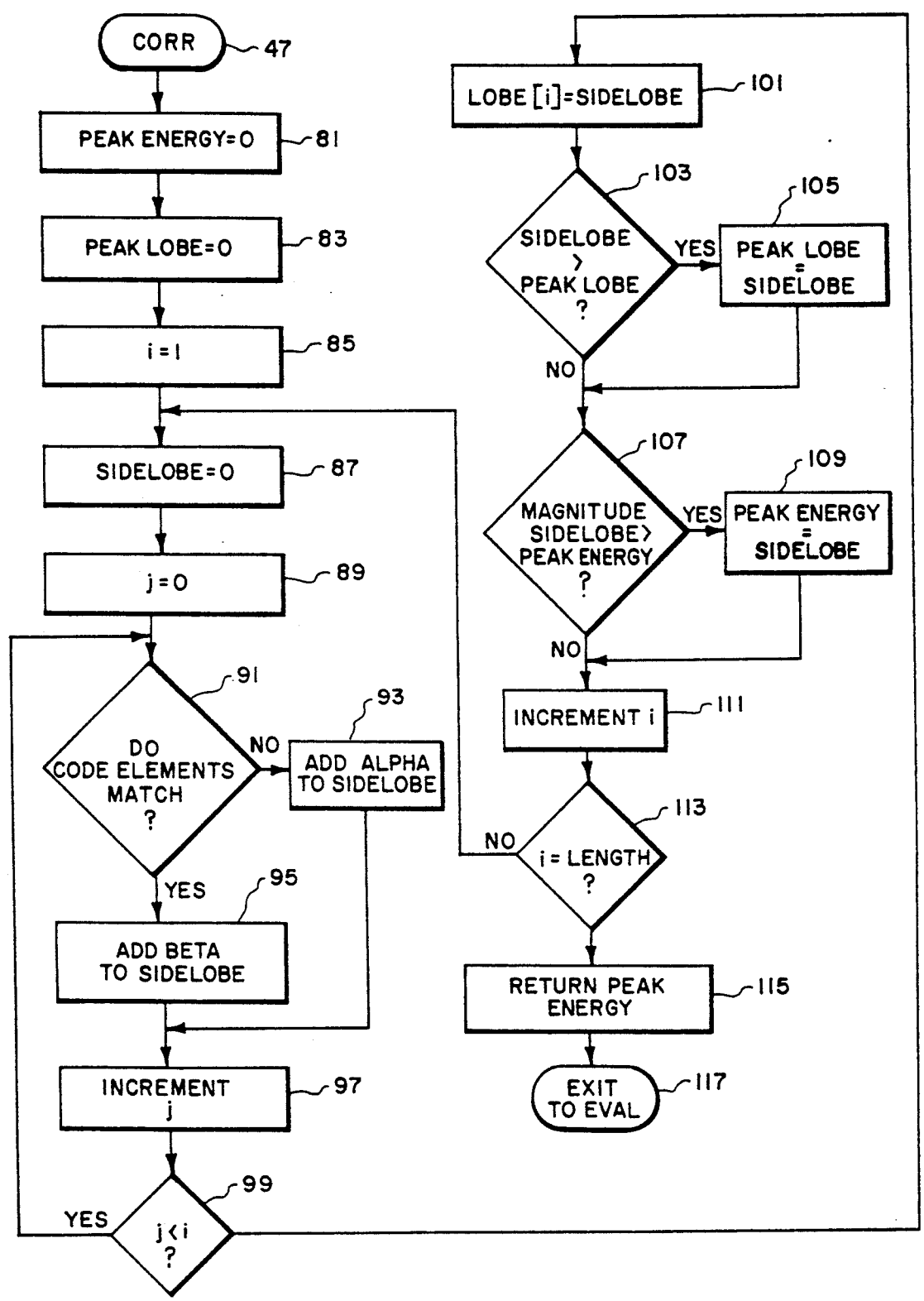

Referring now to FIGS. 4(c) and 4(d), the software of Appendix A evaluates/correlates the first binary code in sequence. The correlation process, which is illustrated by the flowchart of FIG. 4(d) (program steps 81-117), first correlates the binary code 100 for code length three, correlates the binary code 1000 for code length four and correlates the binary code 10000 for code length five.

For example, when the user requests an evaluation of codes of length three (illustrated by FIGS. 2 and 3) the code 100 is processed by the correlation process of steps 81-117. Specifically, program step 91 compares the code elements and when the code elements match, that is the codes are in phase, the element Beta is added to the sidelobe (program step 95). In a like manner, when the code elements do not match, the element Alpha is added to the sidelobe (program step 93). The correlation subroutine continues this process until "i" equals the code length (program step 113) which is the absolute value of the peak magnitude of the mainlobe. The program of Appendix A then exits the correlation subroutine for the particular binary code under evaluation proceeding to program step 49. For the code 100 the correlation process will provide the waveform illustrated in FIG. 3(b) when alpha is −1 and beta is 1.

Upon completing the evaluation subroutine of program step 25 the program of Appendix A returns (program step 77) to program step 39, ask whether the last code has been evaluated, that is has a carry bit occurred. For example, when the code is of length four a carry bit will occur at 10000. The program of Appendix A then proceeds to program step 41. If, however, the answer is "no" the program of Appendix A evaluates the next sequential binary code.

Since the code being evaluated is the first sequential code of length N, that is 100 for length 3, 1000 for length 4 and 10000 for length 5, the program of Appendix A returns to program step 25.

The software of Appendix A also eliminates allomorphic forms of a particular code from correlation processing beginning at program step 27. Program step 27 ask whether the code is an odd length code. If the answer is yes, that is the binary code under evaluation is an odd length code, then the program proceeds to program step 33.

Program step 33 ask whether the code being evaluation is an odd palindrome. If the answer is "no" the program proceeds to program step 37. If the answer is "yes" than the program proceeds to program step 34 setting the middle bit of the code to a logic one. For example, referring to Table III, the program of Appendix A will set the middle bit of the binary code 10001 to a logic one allowing the program of Appendix A to skip the correlation process for codes between 10001 and 10101. In a like manner, the program of Appendix A will set the middle bit of the binary 11011 to a logic one allowing the program to skip the correlation process for codes between 11011 and 11111. The program next proceeds to the evaluation subroutine of program step 25.

If the binary code is an even length code such as the codes in Table II, the program of Appendix A proceeds to program step 29. Program step 29 ask whether the code is an even doublet or mixed doublet. If the answer is "no" then the program proceeds to program step 37. If the answer is yes then the program of Appendix A inverts the low order bits (program step 31). For example, referring to Table II, the program of Appendix A will set the low order bits (two least significant bits) of the binary code 1100 (mixed doublet) to logic ones allowing the program of Appendix A to skip the correlation process for codes between 1100 and 1111 (doublet). The program next proceeds to the evaluation subroutine of program step 25.

Referring again to FIG. 4(c), during program step 45 an internal program counter is incremented for all binary codes previously correlated by the program of Appendix A. Thus, when the last binary code correlated is 10000, the counter is incremented to 10001 which is the next sequential code for correlation. Further, when the last binary code correlated is 11000, the counter is incremented to 11001 which is the next sequential binary code for correlation.

The program of Appendix A next proceeds to the correlation subroutine (program step 47) for the binary code under evaluation. The correlation process then correlates the binary code under evaluation. For example, the codes of length three illustrated by FIGS. 2 and 3 are processed by the correlation process of steps 81-117. The program of Appendix A then exits the correlation subroutine for the particular binary code under evaluation proceeding to program step 49.

Referring to FIG. 4(c), when the user request that all binary codes being evaluated for correlation by the program of Appendix A be shown on a monitor, the program proceeds to program step 51. This step allows the user to view the code on the monitor regardless of the codes acceptability to the user. For example, when the user specifies a code length of five; an alpha of −1; a beta of 1; answers the question "Use phased sidelobe level as threshhold? " yes; specifies a phased sidelobe of 1 and request that all codes being evaluated be shown, the following will appear on the monitor.

| 00001 | −1 | 0  | 1  | 2  | 5 | [2] | [2] |
|-------|----|----|----|----|---|-----|-----|
| 10001 | 1  | −2 | −1 | 0  | 5 | [1] | [2] |
| 10101 | 1  | −2 | 3  | −4 | 5 | [3] | [4] |
| 01101 | −1 | 2  | −1 | −2 | 5 | [2] | [2] |
| 11101 | 1  | 0  | 1  | 0  | 5 | [1] | [1] |
| 00011 | −1 | −2 | −1 | 2  | 5 | [2] | [2] |
| 10011 | 1  | 0  | −3 | 0  | 5 | [1] | [3] |
| 01011 | −1 | 0  | 1  | −2 | 5 | [1] | [2] |
| 11011 | 1  | 2  | −1 | 0  | 5 | [2] | [2] |
| 11111 | 1  | 2  | 3  | 4  | 5 | [4] | [4] |
| 0 → 0 1 → 4 | | | | | | | |

10 candidates for length 5. 4 judged acceptable. However, if the user request that only the codes which meet the phased sidelobe threshold of one be shown (program steps 65 and 67), that is the user answers the question "Show all evaluated codes?" no, then the following will appear on the

| 10001 | 1  | −2 | −1 | 0  | 5 | [1] | [2] |
|-------|----|----|----|----|---|-----|-----|
| 11101 | 1  | 0  | 1  | 0  | 5 | [1] | [1] |
| 10011 | 1  | 0  | −3 | 0  | 5 | [1] | [3] |
| 01011 | −1 | 0  | 1  | −2 | 5 | [1] | [2] |
| 0 → 0 1 → 4 | | | | | | | |

10 candidates for length 5. 4 judged acceptable. Thus, when codes 00001, 10101, 01101, 00011, 11011 and 11111 are evaluated the computer program of Appendix A skips program step 51 proceeding directly to program step 53 from program step 49.

The computer software of Appendix A proceeds to program steps 53 and 55 which for the binary code being evaluated determines whether the phase sidelobe level is being used as the threshold. For example, the user will observe the following on the monitor when the user uses the program of Appendix A to evaluate binary codes of length 3 and specifies that the phased sidelobe threshold be set at 2.

This program computes pulse compression codes for use with a modified correlation sequence of arbitrary coefficients (Alpha, Beta)

Alpha? −1

-continued

Beta? 1
Generate codes of what length? (<256) 3
Use phased sidelobe level as threshhold? (Y/N) Y
Phased sidelobe threshhold? 2
Restrict selection by sidelobe amplitude level? (Y/N) N
Show all evaluated codes? (Y/N) Y

| 001 | −1 | 0  | 3 | [0] | [1] |
|-----|----|----|---|-----|-----|
| 101 | 1  | −2 | 3 | [1] | [2] |
| 111 | 1  | 2  | 3 | [2] | [2] |

0 → 1 1 → 1 2 → 1
3 candidates for length 3. 3 judged acceptable.
Program Ends

As is best illustrated by FIG. 2(c) and also shown in this example binary code 101 has an absolute value peak sidelobe of one and a mainlobe of three, while the binary code 100, FIG. 3(b), has only a mainlobe of three.

If the phase sidelobe level is not being used to process the codes under evaluation (program step 53) or if the sidelobe for the binary code being evaluated does not exceed the threshold set by the user than the program of Appendix A proceeds to program step 59. When the user answers the questions appearing on the monitor as follows:

Generate codes of what length? (<256) 3
Use phased sidelobe level as threshhold? (Y/N) N
Restrict selection by sidelobe amplitude level? (Y/N) Y
Sidelobe amplitude threshhold? 2 that is the user is using the sidelobe amplitude as a threshold (program steps 59 and 61) the program of Appendix A processes the binary code 101 as shown in FIG. 2(b), and the binary 100 as shown in FIG. 3(b). It should be noted that whenever the sidelobe of a binary code under evaluation exceeds the phased sidelobe level threshold specified by the user (program step 55) or the sidelobe amplitude threshhold specified by the user (program step 63), the program exits to program step 39 of the evaluation subroutine via program step 57 of program step 63.

The program next proceeds to program steps 65 and 67 which provide that the only binary codes which will be shown to the user are those codes which meet, for example, the phased sidelobe threshold specified by the user in program step 17. Thus, for the binary codes of length five having a phased sidelobe level threshold of one, only the following codes will appear on the monitor.

| 10001 | 1  | −2 | −1 | 0  | 5 | [1] | [2] |
|-------|----|----|----|----|---|-----|-----|
| 11101 | 1  | 0  | 1  | 0  | 5 | [1] | [1] |
| 10011 | 1  | 0  | −3 | 0  | 5 | [1] | [3] |
| 01011 | −1 | 0  | 1  | −2 | 5 | [1] | [2] |

The binary code 11111, for example, will not appear on the monitor for observation by the user since the sidelobe amplitude exceeds one causing the program of Appendix A to return (program step 57) to the evaluation subroutine of program step 25.

The program of Appendix A next proceeds to program step 69 and whether the amplitude threshold is being used for correlation (program step 69). If the answer is "no" the program increments the count of binary codes indexed/correlated by the phased sidelobe level specified by the user as the threshold. If the answer is "yes" the program increments the count of binary codes indexed/correlated by the sidelobe amplitude threshold specified by the user. Program step 75 then increments the count of binary codes which meet the phase sidelobe level or sidelobe amplitude thresholds specified by the user.

Upon completing the evaluation subroutine of program step 25 the program of Appendix A returns (program step 77) to program step 39, ask whether the last code has been evaluated and if the answer is "no" evaluates the next sequential binary code. If, however, the answer is "yes" then the program of Appendix A provides the codes for viewing to a monitor for observation by the user.

While the present invention has been illustrated in accordance with the preferred embodiment, it is recognized that variations and changes may be made therein without departing from the invention as set forth in the claims.

Navy Case No. 73958

Appendix A

```
//
//     Modified Pulse compression simulator created for inclusion
//     with patent application.
//
//     Coinventor is Donald Tom.
// include <conio.h>
include <stdio.h>
include <stdlib.h> long int accept = 0;
int alpha;
int beta;
char code[256];
int index;
long int count = 0;
char done = 0;
char len;
char lobe[256];
long int lobe_count[256];
int peak_energy;
int peak_lobe;

int phase_threshhold;
int energy_threshhold;
int use_phase_threshhold;
int use_energy_threshhold;
int show_all_codes;

int corr(void);
char eval(void);
int expnd(void);
int getyn(void);
char incr(void);
char * init(void);
char leap(void);
char palindrome(void);
char * print_code(void);
int show_lobe_count(void);

main()
{
        clrscr();
```

```
puts("\nThis program computes pulse compression codes");
puts("for use with a modified correlation sequence");
puts("of arbitrary coefficients (Alpha, Beta)");

printf("Alpha? ");
scanf("%d", &alpha);

printf("Beta? ");
scanf("%d", &beta);

printf("Generate codes of what length? (<256) ");
scanf("%d", &len);
printf("\nUse phased sidelobe level as threshhold? (Y/N) ");
use_phase_threshhold = getyn();
if(use_phase_threshhold == 'Y')
{
    printf("\nPhased sidelobe threshhold? ");
    scanf("%d", &phase_threshhold);
}
printf("\nRestrict selection by sidelobe amplitude level? (Y/N) ");
use_energy_threshhold = getyn();
if(use_energy_threshhold == 'Y')
{
    printf("\nSidelobe amplitude threshhold? ");
    scanf("%d", &energy_threshhold);
}
printf("\nShow all evaluated codes? (Y/N) ");
show_all_codes = getyn();

init();
while(!done)
{

/*
    If the code is of odd length we first evaluate it for possible
    use, then invoke palindrome logic if necessary.
*/
    eval();
    if(len & 1)
/*
    If the code is a palindrome we jump to the next palindrome
    by setting the middle bit.
*/
    {
        if (palindrome())
        {
            code[(len-1)/2] = 1;
            eval();
        }
    }
    else
    {
/*
    Since the length is even we must check to see if the code is a
    leap code.  If so we invoke leap logic.
*/
```

```c
            if (leap())
            {
                for(index = 0; index < (len/2); index++)
                    code[index] ^= 1;
                eval();
            }
        }
        done = incr();
    }
    show_lobe_count();
    printf("\n\n%d candidates for length", count);
    printf(" %d.  ", len);
    printf("%d judged acceptable.\n", accept);

printf("\nProgram Ends");

} int corr(void)
{
    char i, j;
    int sidelobe;
    peak_energy = 0;
    peak_lobe = 0;
    for(i = 1; i < len; i++)
    {
        sidelobe = 0;
        for(j = 0; j < i; j++)
            sidelobe += (code[j] == code[len-i+j] ? beta : alpha);
        lobe[i] = sidelobe;
        if (sidelobe > peak_lobe)
            peak_lobe = sidelobe;
        if ((abs(sidelobe) > peak_energy))
            peak_energy = abs(sidelobe);
    } return peak_energy;
}
char eval(void)
{
    count++;
    corr();
    if(show_all_codes == 'Y')
    {
        print_code();
        expnd();
    }
    if(use_phase_threshhold == 'Y')
        if(peak_lobe > phase_threshhold) return 0;
    if(use_energy_threshhold == 'Y')
        if(peak_energy > energy_threshhold) return 0;
    if(show_all_codes == 'N')
    {
        print_code();
        expnd();
    }
```

```c
        if(use_energy_threshhold == 'Y')
                lobe_count[peak_energy]++;
        else
                lobe_count[peak_lobe]++;
        accept++;
        return 1;
} int expnd(void)
{
        char i;
        for (i = 1; i < len; i++)
                printf(" %3d", lobe[i]);
        printf(" %3d [%d] [%d]", (beta * len), peak_lobe,
peak_energy);
        return (beta * len);
} int getyn(void)
{
        char key;

while(1)
        {
                key = getch();
                switch(key) {
                case 'y':
                case 'Y':
                        printf("Y\n");
                        return 'Y';
                case 'n':
                case 'N':
                        printf("N\n");
                        return 'N';
                }
        }
} char incr(void)
{
        int index;
        index = 0;
        while(code[index] == 1)
                code[index++] = 0;
        if(index == len)
                return 1;
        code[index] = 1;
        return 0;
} char * init(void)
{
        int index;
        for(index = 0; index < 256; index++)
                code[index] = 0;
        code [len-1] = 1;

for(index = 0; index <256; index++)
                lobe_count[index] = 0;

return code;
```

}

```c
char leap(void)
{
    char i, j, flag;
    i = 0;
    j = len - 1;
    flag = 1;

/*
    First we check to see if the code is an even palindrome.
*/
    while(i < j)
        if(code[i++] != code[j--])
        {
            flag = 0;
            break;
        }
    if (flag)
        return flag;

/*
    Then we check to see if all the bits on one side were
inverted,
    if it were be an even palindrome.
*/ i = 0;
    j = len - 1;
    flag = 1;
    while(i < j)
        if(code[i++] == code[j--])
            return 0;
    return 1;
} char palindrome(void)
{
    char i, j;
    i = 0;
    j = len - 1;
    while (i < j)
        if(code[i++] != code[j--]) return 0;
    return 1;
} char * print_code(void)
{
    char index;
    printf("\n");
    for(index = 0; index < len; index++)
        printf("%d", code[index]);
    printf("\t");

return code;
```

```
} int show_lobe_count(void)
{
        char index;
        char last_lobe = 0;
        for(index = len; index > 0; index--)
        {
                if(lobe_count[index] != 0)
                {
                        last_lobe = index;
                        break;
                }
        }
        printf("\n\n");
        for(index = 0; index <= last_lobe; index++)
                printf("%d --> %d  ", index, lobe_count[index]);
        return 0;
}
```

What is claimed is:

1. An optimization method for sidelobe suppression in a pulse compression radar system utilizing binary coded waveforms in which a plurality of subpulses are transmitted in a carrier pulse signal and a reflection of said subpulses from a target are received by said radar system, said method comprising:

selecting a binary code of length N for correlation, said binary code having a length of at least three, the selected binary code of length N being the subpulses in said carrier signal;

selecting first and second arbitrary coefficients, said first arbitrary coefficient being an out of phase correlation element having a negative numerical value of at least minus one and said second arbitrary coefficient being an in phase correlation element having a positive numerical value;

utilizing said first and second arbitrary coefficients for correlating the reflection of said transmitted signal with a reference signal representative of said transmitted signal to provide a correlated waveform;

said correlated waveform having a plurality of sidelobes and a mainlobe; and providing a visual image of the correlation of the reflection of said transmitted signal with said reference signal, said visual image showing the sidelobes and main lobe of said correlated waveform;

at least some of said sidelobes having a negative amplitude, the remainder of said sidelobes having a positive amplitude and said mainlobe having a positive amplitude, the amplitude of each of said sidelobes being dependent upon the numerical values of said first and second arbitrary coefficients.

2. The optimization method for sidelobe suppression of claim 1 wherein the binary code for optimum mainlobe to sidelobe ratio for codes of length three is 1,0,0 when said first arbitrary coefficient is minus one and said second arbitrary coefficient is one.

3. A method for determining all binary codes of a predetermined length N for sidelobe suppression in a pulse compression radar system, said method comprising:

selecting said binary codes of length N for correlation, said binary codes having a length of between three and two hundred fifty five;

each of said binary codes of length N being one of four allomorphic forms, all allomorphic forms of one of said binary codes having the same correlation characteristics;

the allomorphic forms for each of said binary codes of length N consisting of said binary code, an inversion of said binary code, a complement of said binary code and an inverted complement of said binary code;

eliminating three of the four allomorphic forms of each binary code to reduce the number of binary codes of length N for correlation;

selecting first and second arbitrary coefficients, said first arbitrary coefficient being an out of phase correlation element having a negative numerical value and said second arbitrary coefficient being an in phase correlation element having a positive numerical value of at least one;

correlating each of the remaining binary codes of length N after eliminating the allomorphic forms of each of said binary codes of length N, said first and second arbitrary coefficients effecting the correlation of each of the remaining binary codes of length N; and providing a visual image of the correlation of each binary code of length N, said visual image showing a plurality of sidelobes and a mainlobe for each of said correlated binary codes of length N;

at least some of said sidelobes having a negative amplitude, the remainder of sidelobes having a positive amplitude and said mainlobe having a positive amplitude.

4. The method of claim 3 wherein said first arbitrary coefficient is minus two and said second arbitrary coefficient is one.

5. The method of claim 3 wherein said binary code for optimum mainlobe to sidelobe ratio for binary codes of length three is 1,0,0 when said first arbitrary coefficient is minus one and said second arbitrary coefficient is one.

6. The method of claim 3 wherein the binary codes for optimum mainlobe to sidelobe ratio for binary codes of length four are 1000, 1001, 1011 and 1100 when said first arbitrary coefficient is minus one and said second arbitrary coefficient is one.

7. The method of claim 3 wherein the binary codes for optimum mainlobe to sidelobe ratio for binary codes of length five is 10001, 10111, 11001 and 11010 when said first arbitrary coefficient is minus one and said second arbitrary coefficient is one.

8. A method for determining all binary codes of a predetermined length N for sidelobe suppression in a pulse compression radar system, said method comprising:

- selecting said binary codes of length N for correlation, said binary codes having a length of between three and two hundred fifty five;
- each of said binary codes of length N being one of four allomorphic forms, all allomorphic forms of one of said binary codes having the same correlation characteristics;
- the allomorphic forms for each of said binary codes of length N consisting of said binary code, an inversion of said binary code, a complement of said binary code and an inverted complement of said binary code;
- eliminating three of the four allomorphic forms of each binary code to reduce the number of binary codes of length N for correlation;
- selecting first and second arbitrary coefficients, said first arbitrary coefficient being an out of phase correlation element having a negative numerical value of at least minus one and said second arbitrary coefficient being an in phase correlation element having a positive numerical value of at least one;
- selecting a phase sidelobe threshold, said phase sidelobe threshold having a positive numerical value of at least one;
- correlating each of the remaining binary codes of length N after eliminating the allomorphic forms of each of said binary codes of length N, said first and second arbitrary coefficients effecting the correlation of each of the remaining binary codes of length N; and
- providing a visual image of the correlation of each binary code of length N, said visual image showing a plurality of sidelobes and a mainlobe for each of said correlated binary codes of length N;
- at least some of said sidelobes having a negative amplitude and the remainder of sidelobes having a positive amplitude, the positive amplitude of said sidelobes being limited to the positive numerical value of said phase sidelobe threshold.

9. A method for determining all binary codes of a predetermined length N for sidelobe suppression in a pulse compression radar system, said method comprising:

- selecting said binary codes of length N for correlation, said binary codes having a length of between three and two hundred fifty five;
- each of said binary codes of length N being one of four allomorphic forms, all allomorphic forms of one of said binary codes having the same correlation characteristics;
- the allomorphic forms for each of said binary codes of length N consisting of said binary code, an inversion of said binary code, a complement of said binary code and an inverted complement of said binary code;
- eliminating three of the four allomorphic forms of each binary code to reduce the number of binary codes of length N for correlation;
- selecting first and second arbitrary coefficients, said first arbitrary coefficient being an out of phase correlation element having a negative numerical value of at least minus one and said second arbitrary coefficient being an in phase correlation element having a positive numerical value of at least one;
- selecting an sidelobe amplitude level, said sidelobe amplitude level having a numerical value of at least one;
- correlating each of the remaining binary codes of length N after eliminating the allomorphic forms of each of said binary codes of length N, said first and second arbitrary coefficients effecting the correlation of each of the remaining binary codes of length N; and
- providing a visual image of the correlation of each binary code of length N, said visual image showing a plurality of sidelobes and a mainlobe for each of said correlated binary codes of length N;
- at least some of said sidelobes having a negative amplitude and the remainder of sidelobes having a positive amplitude, the positive and negative amplitudes of said sidelobes being limited to the numerical value of said sidelobe amplitude level.

* * * * *